(12) United States Patent
Palmieri

(10) Patent No.: US 12,298,077 B2
(45) Date of Patent: May 13, 2025

(54) DC PLASMA ELECTRIC ARC FURNACE FOR PROCESSING SOLID WASTE, METHOD OF PROCESSING SOLID WASTE, AND PRODUCTS FORMED FROM DC PLASMA ELECTRIC ARC FURNACE

(71) Applicant: Alain Palmieri, Keene, NH (US)

(72) Inventor: Alain Palmieri, Keene, NH (US)

( * ) Notice: Subject to any disclaimer, the term of this patent is extended or adjusted under 35 U.S.C. 154(b) by 766 days.

(21) Appl. No.: 17/533,694

(22) Filed: Nov. 23, 2021

(65) Prior Publication Data

US 2022/0113090 A1    Apr. 14, 2022

Related U.S. Application Data

(63) Continuation of application No. 16/936,857, filed on Jul. 23, 2020, now Pat. No. 11,209,211.

(51) Int. Cl.
| | |
|---|---|
| *F27B 14/06* | (2006.01) |
| *F23G 7/00* | (2006.01) |
| *F27D 3/00* | (2006.01) |
| *F27D 11/10* | (2006.01) |
| *H05B 7/22* | (2006.01) |

(52) U.S. Cl.
CPC .............. *F27B 14/06* (2013.01); *F23G 7/00* (2013.01); *F27D 3/0025* (2013.01); *F27D 11/10* (2013.01); *H05B 7/22* (2013.01)

(58) Field of Classification Search
CPC .......... F27B 14/02; F27B 14/04; F27B 14/06; F27B 14/0806; F27B 14/14; F23G 7/00; F23G 7/001; F23G 7/003; F27D 3/0025; F27D 3/0033; F27D 3/06; F27D 3/10; F27D 11/10; H05B 7/00; H05B 7/005; H05B 7/102; H05B 7/107; H05B 7/22
See application file for complete search history.

(56) References Cited

U.S. PATENT DOCUMENTS

| | | | | |
|---|---|---|---|---|
| 1,499,922 | A * | 7/1924 | Hadaway, Jr. | F27B 14/06 373/88 |
| 2,322,618 | A * | 6/1943 | Baltzar | C21C 5/56 266/216 |
| 4,870,655 | A * | 9/1989 | Ward | F27B 3/183 373/76 |
| 4,982,410 | A | 1/1991 | Mustoe et al. | |
| 5,241,559 | A * | 8/1993 | Hixenbaugh | F27D 1/1816 373/76 |

(Continued)

FOREIGN PATENT DOCUMENTS

| | | | |
|---|---|---|---|
| CN | 202192079 U | * | 4/2012 |
| JP | 3830417 B2 | * | 10/2006 |

OTHER PUBLICATIONS

Neuschütz et al., Nitrogen Removal and Arc Voltage Increase in EAF Steelmaking by Methane Injection into the Arc, Steel Research, Jan. 2003, pp. 19-25, vol. 74 No. 1.

*Primary Examiner* — Hung D Nguyen
(74) *Attorney, Agent, or Firm* — Paratus Law Group, PLLC

(57) ABSTRACT

A DC plasma arc furnace, a method of co-processing waste and metal, a method of producing energy by processing material using the furnace, and the products produced by the furnace are provided. Metal may be efficiently processed by the furnace via an increased organic content in other feedstock fed into the furnace.

28 Claims, 7 Drawing Sheets

(56) References Cited

U.S. PATENT DOCUMENTS

| | | | | |
|---|---|---|---|---|
| 5,267,257 A | * | 11/1993 | Jhawar | F27B 5/16 |
| | | | | 373/113 |
| 5,731,564 A | * | 3/1998 | Kujawa | C03B 5/025 |
| | | | | 219/121.36 |
| 5,756,957 A | | 5/1998 | Titus et al. | |
| 5,942,023 A | | 8/1999 | Bitler et al. | |
| 6,015,963 A | | 1/2000 | Flannery et al. | |
| 6,380,507 B1 | | 4/2002 | Childs | |
| 6,804,582 B1 | * | 10/2004 | Gerhan | F27B 3/28 |
| | | | | 373/88 |
| 7,767,136 B2 | * | 8/2010 | Argenta | F27D 17/003 |
| | | | | 373/79 |
| 8,491,836 B2 | | 7/2013 | Matschullat | |
| 10,508,319 B1 | | 12/2019 | Shaw et al. | |
| 2004/0056394 A1 | | 3/2004 | Jackson et al. | |
| 2011/0274580 A1 | * | 11/2011 | Deegan | C22B 9/226 |
| | | | | 164/505 |
| 2012/0117875 A1 | * | 5/2012 | Juvan | C10J 3/20 |
| | | | | 48/66 |
| 2017/0190647 A1 | | 7/2017 | Cunningham et al. | |

* cited by examiner

DC PLASMA ELECTRIC ARC FURNACE FOR PROCESSING SOLID WASTE, METHOD OF PROCESSING SOLID WASTE, AND PRODUCTS FORMED FROM DC PLASMA ELECTRIC ARC FURNACE

CROSS REFERENCE TO PRIOR APPLICATION

This application is a continuation of U.S. patent application Ser. No. 16/936,857 (filed on Jul. 23, 2020), which is hereby incorporated by reference in its entirety.

BACKGROUND OF THE INVENTION

Waste disposal using conventional means is energy intensive and often does not result in a suitable reduction in the size or volume of the waste that is treated. In addition, disposal of waste through means such as landfills is becoming increasingly more difficult as the world produces more waste. Landfills also suffer from being generally undesirable and potentially contaminating groundwater.

Incinerator systems have been used in the past, but they are not convenient, as they require extensive air pollution control systems to reduce emissions below regulatory levels and may produce toxic byproducts.

DC plasma arc furnaces provide a benefit in that they completely dissociate waste material into its individual atomic or molecular elements, but the technology is disfavored because of the large amount of energy necessary to run such a furnace.

In addition to the above, the reuse and recycling of metal in waste presents processing problems. DC plasma arc furnaces are not used to process metals because of the amount of energy required to do so. Blast furnaces are the current state of the art, as they provide large energy savings over existing DC plasma arc furnaces when it comes to processing metal. The use of DC plasma arc furnaces to recycle metal is not currently considered a viable option because of the large amount of energy needed to do so.

Thus, the present inventor set about addressing the problem of how to efficiently process waste and recycle metal.

Unless otherwise noted, all documents referred to herein are incorporated by reference in their entirety.

In addition, unless it is understood otherwise from the context, the term "furnace" herein is used as shorthand for "DC plasma electric arc furnace."

BRIEF SUMMARY OF THE INVENTION

One embodiment of the present disclosure is a furnace configured to process metal and waste materials, wherein the furnace is a DC plasma arc furnace.

Another embodiment of the present disclosure is a method of processing metal in a DC plasma arc furnace.

Another embodiment of the present disclosure is a method of separating metals into their atomic elements using a DC plasma arc furnace.

Another embodiment of the present disclosure is a ship carrying on it at least one DC plasma arc furnace recited in any of the items above.

Another embodiment of the present disclosure is a method of processing materials using a DC plasma arc furnace.

Another embodiment of the present disclosure is a method of processing radioactive materials using a DC plasma arc furnace.

Another embodiment of the present disclosure is a method of increasing the power output of a DC plasma arc furnace.

Another embodiment of the present disclosure is a method of increasing the organic content of feedstock fed into a DC plasma arc furnace.

Another embodiment of the present disclosure is a method of preparing material for entry into a DC plasma arc furnace.

Another embodiment of the present disclosure is a method of changing the distance or angle between functional electrodes in a DC plasma arc furnace during operation based on the feedstock being fed into the furnace.

Another embodiment of the present disclosure is an electrode collar that permits angular movement of electrodes in a DC plasma arc furnace during operation of the furnace.

Another embodiment of the present disclosure is an electrode collar that permits horizontal movement of electrodes in a DC plasma arc furnace during operation of the furnace.

Another embodiment of the present disclosure is a furnace, method, ship, or electrode collar according to any of the previous embodiments, as appropriate, wherein metal feedstock and a non-metal feedstock are processed at the same time in the furnace.

Another embodiment of the present disclosure is a furnace, method, ship, or electrode collar according to any of the previous embodiments, as appropriate, comprising a vestibule that serves to remove oxygen and/or other reactive gases from feedstock.

Another embodiment of the present disclosure is a furnace, method, ship, or electrode collar according to any of the previous embodiments, as appropriate, in which the vestibule provides pressure to push feedstock into the furnace.

Another embodiment of the present disclosure is a furnace, method, ship, or electrode collar according to any of the previous embodiments, as appropriate, comprising a conveyor belt used to provide feedstock to the furnace.

Another embodiment of the present disclosure is a furnace, method, ship, or electrode collar according to any of the previous embodiments, as appropriate, used to process any one or more of waste materials, municipal solid waste, iron ore, radioactive material, organic material, and metal.

Another embodiment of the present disclosure is a furnace, method, ship, or electrode collar according to any of the previous embodiments, as appropriate, wherein the waste material contains from 0% to less than 50% metal.

Another embodiment of the present disclosure is a furnace, method, ship, or electrode collar according to any of the previous embodiments, as appropriate, wherein the waste material comprises one or more of municipal solid waste, industrial or household waste chemicals, chemical weapons, medical waste, radioactive material, infectious or otherwise biologically hazardous materials, human or animal sewage, soils or marine sediments excavated or dredged from contaminated sites, recovered waste material excavated from landfills, used tires, used oil filters, vegetable or petroleum based oils, oil bearing shale, and high sulfur coal.

Another embodiment of the present disclosure is a furnace, method, ship, or electrode collar according to any of the previous embodiments, as appropriate, wherein the waste material is 65-100% organic.

Another embodiment of the present disclosure is a furnace, method, ship, or electrode collar according to any of the previous embodiments, as appropriate, wherein a metal feedstock is at least 50% metal, and may be ferrous or non-ferrous, or mixtures of both.

Another embodiment of the present disclosure is a furnace, method, ship, or electrode collar according to any of the previous embodiments, as appropriate, wherein the total feedstock fed into the furnace, not including a metal feedstock, is at least 65% organic.

Another embodiment of the present disclosure is a furnace, method, ship, or electrode collar according to any of the previous embodiments, as appropriate, wherein the total feedstock fed into the furnace, not including a metal feedstock, is at least 75% organic.

Another embodiment of the present disclosure is a furnace, method, ship, or electrode collar according to any of the previous embodiments, as appropriate, wherein the non-metal feedstock comprises municipal solid waste and either (1) pelletized sewage sludge; (2) pelletized harbor sediment; or (3) quartered tires, or any combination of all three.

Another embodiment of the present disclosure is a furnace, method, ship, or electrode collar according to any of the previous embodiments, as appropriate, wherein feedstock enters the furnace through more than one entry point, and non-metal feedstock may enter the furnace through an entry point different than the entry point through which metal feedstock is fed into the furnace.

Another embodiment of the present disclosure is a furnace, method, ship, or electrode collar according to any of the previous embodiments, as appropriate, comprising tubes configured to be present at a level beneath the top of the slag layer in the furnace.

Another embodiment of the present disclosure is a furnace, method, ship, or electrode collar according to any of the previous embodiments, as appropriate, wherein the tubes are configured to deliver steam to the furnace.

Another embodiment of the present disclosure is a furnace, method, ship, or electrode collar according to any of the previous embodiments, as appropriate, comprising a gas exit.

Another embodiment of the present disclosure is a furnace, method, ship, or electrode collar according to any of the previous embodiments, as appropriate, comprising at least one electrode.

Another embodiment of the present disclosure is a furnace, method, ship, or electrode collar according to any of the previous embodiments, as appropriate, comprising at least two electrodes.

Another embodiment of the present disclosure is a furnace, method, ship, or electrode collar according to any of the previous embodiments, as appropriate, comprising at least three electrodes.

Another embodiment of the present disclosure is a furnace, method, ship, or electrode collar according to any of the previous embodiments, as appropriate, wherein the tips of at least one electrode are submerged in a slag bath inside the furnace.

Another embodiment of the present disclosure is a furnace, method, ship, or electrode collar according to any of the previous embodiments, as appropriate, wherein one or more of the electrodes are made from multiple stacked segments.

Another embodiment of the present disclosure is a furnace, method, ship, or electrode collar according to any of the previous embodiments, as appropriate, comprising a backboard electrode.

Another embodiment of the present disclosure is a furnace, method, ship, or electrode collar according to any of the previous embodiments, as appropriate, wherein the backboard electrode does not generate a plasma arc.

Another embodiment of the present disclosure is a furnace, method, ship, or electrode collar according to any of the previous embodiments, as appropriate, wherein one or more of the electrodes are hollow-core electrodes.

Another embodiment of the present disclosure is a furnace, method, ship, or electrode collar according to any of the previous embodiments, as appropriate, wherein organic material and/or metal is fed into the furnace via a hollow-core electrode.

Another embodiment of the present disclosure is a furnace, method, ship, or electrode collar according to any of the previous embodiments, as appropriate, wherein municipal solid waste and/or tires are fed into the furnace by bouncing them off of the backboard electrode.

Another embodiment of the present disclosure is a furnace, method, ship, or electrode collar according to any of the previous embodiments, as appropriate, wherein a plasma arc is generated between at least two of the electrodes.

Another embodiment of the present disclosure is a furnace, method, ship, or electrode collar according to any of the previous embodiments, as appropriate, comprising a slag bath layer.

Another embodiment of the present disclosure is a furnace, method, ship, or electrode collar according to any of the previous embodiments, as appropriate, wherein the slag bath layer comprises non-metallic materials and/or minerals.

Another embodiment of the present disclosure is a furnace, method, ship, or electrode collar according to any of the previous embodiments, as appropriate, wherein the slag bath layer is 10-18 feet thick, and may be maintained at such a thickness.

Another embodiment of the present disclosure is a furnace, method, ship, or electrode collar according to any of the previous embodiments, as appropriate, comprising a molten metal layer.

Another embodiment of the present disclosure is a furnace, method, ship, or electrode collar according to any of the previous embodiments, as appropriate, wherein the molten metal layer is 18-48 inches thick, and may be maintained at such a thickness.

Another embodiment of the present disclosure is a furnace, method, ship, or electrode collar according to any of the previous embodiments, as appropriate, wherein the molten metal layer comprises ferrous and non-ferrous metals.

Another embodiment of the present disclosure is a furnace, method, ship, or electrode collar according to any of the previous embodiments, as appropriate, comprising collars, which in some embodiments may circumferentially surround a portion of the part of the electrode that is located on the exterior of the furnace, and which may be configured to permit horizontal movement and/or angular movement of the electrodes during operation of the furnace, and in particular during processing of feedstock.

Another embodiment of the present disclosure is a furnace, method, ship, or electrode collar according to any of the previous embodiments, as appropriate, wherein the collars permit the horizontal movement and/or angular movement of the electrodes at the same time that feedstock is being processed in the furnace.

Another embodiment of the present disclosure is a furnace, method, ship, or electrode collar according to any of the previous embodiments, as appropriate, wherein the collars utilize air pressure to change the angle of the electrode.

Another embodiment of the present disclosure is a furnace, method, ship, or electrode collar according to any of the previous embodiments, as appropriate, wherein the collars comprise an upper and a lower portion.

Another embodiment of the present disclosure is a furnace, method, ship, or electrode collar according to any of the previous embodiments, as appropriate, wherein pressure differentials between the upper and lower portions alter the angle of the electrode.

Another embodiment of the present disclosure is a furnace, method, ship, or electrode collar according to any of the previous embodiments, as appropriate, comprising sensors monitoring the movement and/or position of the collar.

Another embodiment of the present disclosure is a furnace, method, ship, or electrode collar according to any of the previous embodiments, as appropriate, comprising one or more of a titrater, a moisture meter, magnetometer, oven, mass spectrometer, gas spectrometer, Geiger counter, an FTIR spectrometer, a Raman spectrometer, a thermogravimetric analyzer, a differential scanning calorimeter, an NMR spectrometer, a scanning electron microscope, and an energy dispersive X-ray analyzer.

Another embodiment of the present disclosure is a furnace, method, ship, or electrode collar according to any of the previous embodiments, as appropriate, comprising a port located at a level of the slag bath and/or a port located at a level of the molten metal layer.

Another embodiment of the present disclosure is a furnace, method, ship, or electrode collar according to any of the previous embodiments, as appropriate, wherein the port is used to sample or obtain materials from the slag bath.

Another embodiment of the present disclosure is a furnace, method, ship, or electrode collar according to any of the previous embodiments, as appropriate, comprising a port located at a level of the molten metal layer.

Another embodiment of the present disclosure is a furnace, method, ship, or electrode collar according to any of the previous embodiments, as appropriate, wherein the port is used to remove metal from the molten metal layer.

Another embodiment of the present disclosure is a furnace, method, ship, or electrode collar according to any of the previous embodiments, as appropriate, comprising wheels configured to transport the furnace.

Another embodiment of the present disclosure is a furnace, method, ship, or electrode collar according to any of the previous embodiments, as appropriate, comprising a sled configured to tilt the furnace.

Another embodiment of the present disclosure is a furnace, method, ship, or electrode collar according to any of the previous embodiments, as appropriate, wherein the furnace is portable.

Another embodiment of the present disclosure is a furnace, method, ship, or electrode collar according to any of the previous embodiments, as appropriate, wherein the furnace is two stories tall.

Another embodiment of the present disclosure is a furnace, method, ship, or electrode collar according to any of the previous embodiments, as appropriate, configured to process from 10-25 tons of metal per hour.

Another embodiment of the present disclosure is a furnace, method, ship, or electrode collar according to any of the previous embodiments, as appropriate, configured to process from 15-75 tons of inorganic and organic waste.

Another embodiment of the present disclosure is a furnace, method, ship, or electrode collar according to any of the previous embodiments, as appropriate, configured to remove metal from the furnace, wherein the metal removed contains at least 75% of a single atomic species of metal.

Another embodiment of the present disclosure is a furnace, method, ship, or electrode collar according to any of the previous embodiments, as appropriate, configured to produce frit.

Another embodiment of the present disclosure is a furnace, method, ship, or electrode collar according to any of the previous embodiments, as appropriate, comprising feeding organic matter into the furnace such that an organic content of all non-metal feedstock being processed in the furnace is at least 65% or 75% or 90%.

Another embodiment of the present disclosure is a furnace, method, ship, or electrode collar according to any of the previous embodiments, as appropriate, wherein the organic matter fed into the furnace comprises one item selected from the group consisting of sewage or harbor sediment (which may be pelletized), yard waste (which may be selected from the group consisting of grass, tree limbs, brush, and leaves), and tires (which may be quartered).

Another embodiment of the present disclosure is a furnace, method, ship, or electrode collar according to any of the previous embodiments, as appropriate, comprising chopping, shredding, pelletizing, compacting, powdering, or granulating waste material prior to feeding it into the furnace.

Another embodiment of the present disclosure is a furnace, method, ship, or electrode collar according to any of the previous embodiments, as appropriate, wherein the waste material is municipal solid waste, which may be shredded and compacted to a size of, for example, from 10-30 inches wide.

Another embodiment of the present disclosure is a furnace, method, ship, or electrode collar according to any of the previous embodiments, as appropriate, wherein the waste material is sewage sludge, which may be pelletized to a size of, for example, 2-3 $in^2$.

By feeding the disclosed furnace a feedstock that includes an increased amount of organic material, it is possible to obtain increased energy production, thereby allowing for the unexpected ability to create enough energy in the furnace to efficiently process not only metals, including iron ore and other types of metal, which is typically a very energy intensive and costly process, but also waste materials.

The disclosed processing system may be used to process steel and/or waste and is based upon thermal reduction using a DC plasma electric arc. Without wishing to be bound by theory, the principle is based upon passing an electric current through a plasma gas medium that generates a resistance in the plasma to produce extreme heat. Under controlled conditions, the process dissociates the materials introduced into the furnace, and chemically reactive atoms can be directed to the generation of various commercially viable by-products without the release of any deleterious materials into the atmosphere or the need to dispose of potentially hazardous residues. Even toxic materials, often the result of chelated bonds between organic and inorganic toxic substances, can be dissociated using the processing system and method herein, and such substances may be beneficially reused in their non-toxic, component states most captured in non-leaching, vitrified frit. In addition, radioactive materials may be processed using the furnace and methods disclosed herein, as the furnace and methods herein serve to separate the radioactive materials from other materials present in the materials fed into the furnace.

The furnace and methods disclosed herein may be used in a conventional land-based setting. However, the furnace and methods disclosed herein provide for a size reduction in the furnace that permits the furnace to be made smaller than otherwise possible while still providing the same or greater power output as a larger, conventional furnace. As a result, one or more of the furnaces disclosed herein may be loaded onto, for example, a container ship, a barge or other ship, or a truck or other vehicle, to provide for a mobile processing center, which may process, for example, solid waste and metal in various locations and then travel to a new location to process waste there.

These and other embodiments will be discussed in more detail in the sections that follow.

DETAILED DESCRIPTION OF THE INVENTION

The waste processing system discussed herein is based upon thermal reduction using DC plasma electric arc. The principle is based upon passing an electric current through a plasma gas medium that generates a resistance in the plasma to produce extreme heat. The system herein is capable of generating sustained working temperatures of up to, for example, 10,000 degrees Celsius (° C.). The very high temperatures at which plasma arc systems operate dissociate any substance into its component atoms and create very active ions that promote rapid chemical reactions. Under controlled conditions, such dissociated, chemically reactive atoms can be directed to the generation of various commercially viable by-products without the release of any deleterious materials into the atmosphere or the need to dispose of potentially hazardous residues. It is important to note that even toxic materials, often the result of chelated bonds between organic and inorganic toxic substances, are dissociated in such a process and are beneficially reused in their non-toxic, component states. Radioactive materials are also dissociated in such a process, and such dissociation and separation from non-radioactive components that are also present in the processed materials may serve as a useful way to recycle materials that contain or are mixed with radioactive materials.

Figure 1:
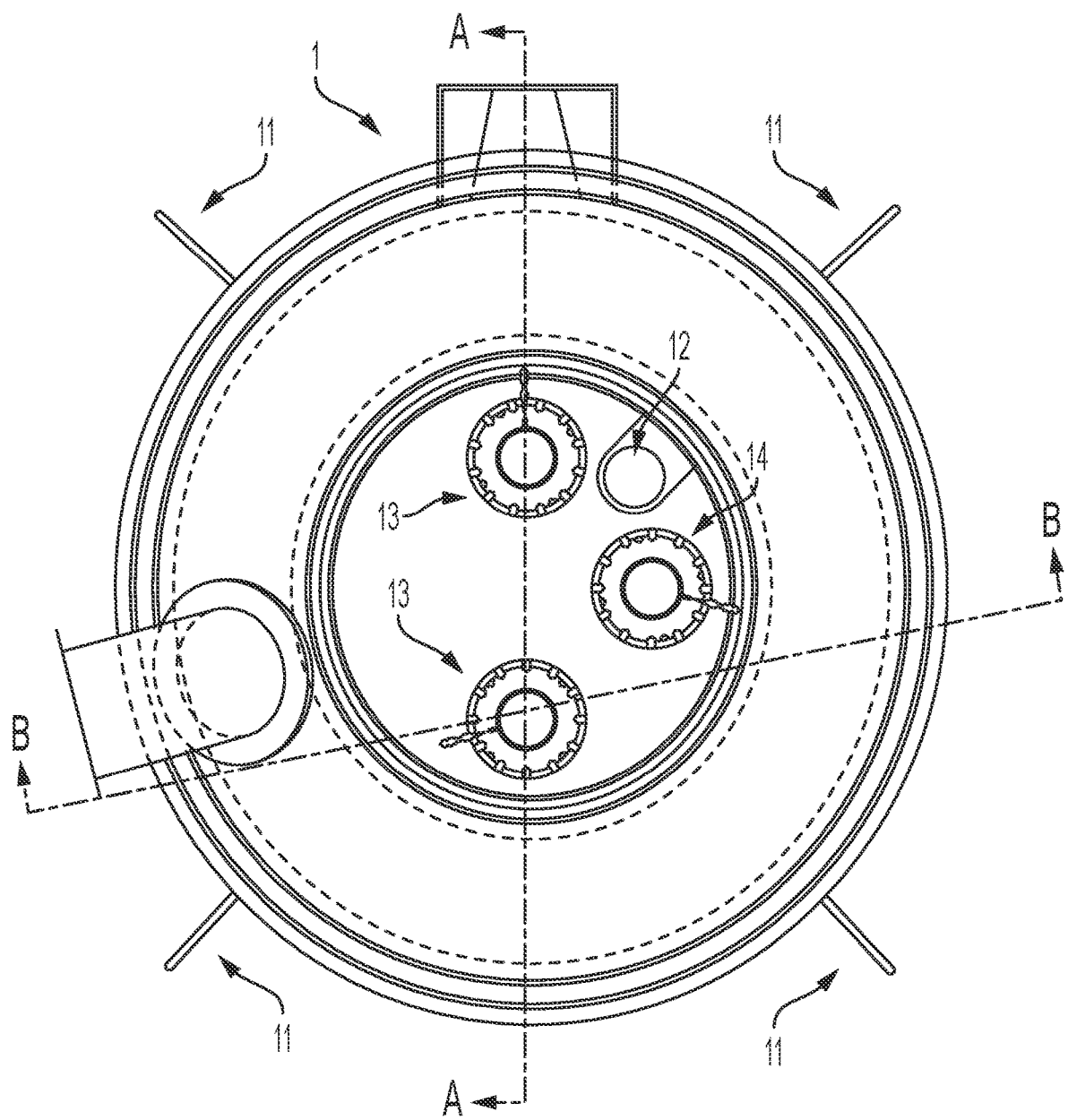
FIG. 1 is a top (crown) view of a DC plasma electric arc furnace.

FIG. 1 shows one embodiment of the present disclosure. In FIG. 1, materials to be processed enter the furnace 1 through the large tubular device 10. The tubular device 10 does not need to be tubular, and may be any shape suitable for use in introducing the materials to be processed into the furnace. In certain embodiments, there may be more than one tubular device 10, each configured for use in introducing a different type of materials into the furnace. For example, in certain embodiments, inorganic material may be introduced via one tubular device, while a different tubular device is used to introduce organic material into the furnace. The size of the tubular device 10 is not particularly limited, and may be determined based on the size of the material to be introduced into the furnace.

In certain embodiments, the materials may be fed via conveyor through a nitrogen-pressured vestibule 10A (shown in FIG. 3 only) interfaced to the tubular device 10. The nitrogen-pressured vestibule may serve to provide pressure to push the material into the furnace. The nitrogen-pressured vestibule may also serve to remove oxygen and other reactive gases from the feedstock. In addition, a conveyor belt may run through the nitrogen-pressured vestibule to assist in the feeding of the materials into the furnace.

The material fed into the furnace is not particularly limited, may include, for example, any one or more of waste materials, municipal solid waste, iron ore, radioactive material, organic material, and various unrestricted types of metal. In certain embodiments, multiple types of materials are fed into the furnace, either through the same tubular device 10 or via separate tubular devices.

Waste materials as used herein is a generic term that includes any material intended to be disposed of. In some embodiments, the waste material does not contain metal, or contains from 0% to less than 50% metal. In certain embodiments, the waste material does not contain over 50%, or over 40%, or over 35%, or over 25% metal. Waste materials, and materials that may be processed according to the present disclosure, include but are not limited to municipal solid waste, industrial or household waste chemicals, chemical weapons, medical waste, radioactive material, infectious or otherwise biologically hazardous materials, human or animal sewage, soils or marine sediments excavated or dredged from contaminated sites, recovered waste material excavated from landfills, used tires, or used oil filters as well as vegetable or petroleum based oils, oil bearing shale and high sulfur coal. In certain embodiments herein, the term "non-metal feedstock" may refer to waste materials or a feedstock of waste materials.

Municipal solid waste may include, for example, material obtained from a landfill. Municipal solid waste could also be obtained directly from business or household waste containers, transferred to the furnace via, for example, garbage truck or barge. In certain preferred embodiments, the municipal solid waste is not obtained from a landfill. Municipal solid waste typically contains, for example, at most about 65% organic material. In preferred embodiments, when municipal solid waste is present in feedstock, radioactive material is not present in the feedstock.

Iron ore may include, for example, rocks or minerals in which iron is present. Iron ores that may be used within the scope of the present disclosure are not particularly limited.

Radioactive material may include, for example, waste from nuclear reactors or radioactive materials to be recycled or separated from other materials, such as in warheads or used nuclear reactor components. In certain embodiments, if radioactive materials are used as feedstock, non-radioactive materials, and in particular non-radioactive organic items, are not present in the feedstock. In other embodiments, metal may be co-processed or present in the feedstock in addition to radioactive materials. In other embodiments, organic items may be present in the total feedstock fed into the furnace, in addition to radioactive materials. In embodiments in which organic feedstock is fed into the furnace concurrently with a radioactive feedstock, the organic feedstock may be separately fed into the furnace or may be fed into the furnace in the same feedstock stream.

Organic material may include, for example, sewage or harbor sediment (which may be pelletized or otherwise properly shaped prior to processing in the furnace), yard waste (such as grass, tree limbs, brush, or leaves), or tires (which may be quartered or otherwise properly shaped prior to processing in the furnace). With respect to organic material to be fed into the furnace, it is recognized that waste separation technology and impurities present in a material mean that an organic feedstock may be less than 100% organic. Organic feedstock contains more organic content than municipal solid waste, which typically contains 65% organic materials. Thus, organic feedstock as that term is used in the present specification means a feedstock that from, for example, 65-100% organic. In certain embodiments, the organic feedstock is over 65% organic, and in preferred embodiments the organic feedstock is a feedstock that contains at least 75%, more preferably at least 80%, more preferably at least 85%, more preferably at least 90%, more preferably at least 95%, even more preferably at least 99%, and most preferably 100% organic material.

The metal that may be processed may include, for example, ferrous or non-ferrous materials, or combinations thereof, including the iron ore noted above. Examples include scrap steel, aluminum, gold, silver, titanium, electrum and the like. A metal feedstock may contain no organic material. In other embodiments, the metal feedstock is at least 50% metal, or at least 60% metal, or at least 65% metal, or at least 70% metal, or at least 80% or at least 90/o metal, or at least 95% metal, or at least 99% metal.

It was surprisingly found that processing organic material, such as tires or pelletized sewage sludge, in addition to municipal solid waste, increased the energy output of the furnace. An increased percentage of organic content in the feedstock led to an increased energy output of the furnace. For example, when the feedstock comprised solely municipal solid waste having an organic content of about 65%, a 1% increase in the total concentration of organic material in the feedstock was found to lead to at least a 1.05% increase in energy output by the furnace.

Processing municipal solid waste, which may have an organic content of about 65%, in a DC plasma arc furnace will not provide enough energy to allow the furnace to operate as a power station. However, by adding organic material to the feedstock and increasing the overall organic content of the feedstock, the present inventor found that the power generated by the furnace greatly increases. For example, in one embodiment, when the non-metal feedstock fed into the furnace contains 75-80% organic material, the furnace may be used as a local power station as a result of the increased energy output. This permits the furnace to act as a power plant. In another exemplary embodiment, it was surprisingly found that the extra power generated by the furnace as a result of the increased organic content of the non-metal feedstock may be used to facilitate the processing of metals in the furnace. In certain embodiments, the furnace both processes metal from a metal feedstock and produces excess electricity as a result of the increased organic content of the non-metal feedstock, thus permitting the furnace to simultaneously act as both a power generator and a metal processing unit. It should be noted that the terms power and electricity as used herein may be used interchangeably unless the context indicates otherwise.

Co-processing of metal with waste materials is made possible in part by increasing the concentration of organic material in the non-metal feedstock, such that the concentration of organic material in the non-metal feedstock is greater than 65%. By combining, for example, municipal solid waste with organic material and feeding the combination into the furnace, the increased energy output by the furnace means that less energy is required to co-process metals that may be provided to the furnace in a metal feedstock. The amount of energy necessary to process waste materials and metals in the furnace herein is therefore less than the amount of energy that would be needed if municipal solid waste, as an example, and metals were processed in separate furnaces. The furnace and methods disclosed herein therefore provide for a previously undisclosed efficient and cost-effective method for processing or recycling metal using DC plasma arc technology, by processing metals simultaneously with waste materials having a high organic content.

By increasing the organic content of the non-metal feedstock to at least, for example, 80%, it is possible in some embodiments to generate 40 MW of electricity from a furnace that otherwise would provide only 10 MW of energy if municipal solid waste alone were used as a feedstock.

The total feedstock fed into the furnace may comprise one or more of the items described above. A preferred non-metal feedstock contains pelletized sewage sludge, harbor sediment, and/or quartered tires; and in particular may contain any combination of those materials. Another preferred non-metal feedstock contains municipal solid waste and either (1) pelletized sewage sludge; (2) pelletized harbor sediment; or (3) quartered tires, or any combination of all three. Thus, another embodiment of the present disclosure is increasing the organic content of a non-metal feedstock fed into the furnace by adding organic matter, such as the materials noted herein.

The total feedstock fed into the furnace may be provided in one or more different feedstock streams. Each stream of feedstock may comprise different materials and may be fed into the furnace at different positions, based on the type of feedstock present in the stream. For example, metal feedstock, organic feedstock, and municipal solid waste feedstock may be mixed and fed into the furnace as a single stream in a single location, for example via the large tubular device 10. Alternatively, the metal feedstock, organic feedstock, and municipal solid waste may be fed into the furnace as three separate feedstocks in three different locations. In such an embodiment, the metal feedstock may be fed into the furnace at any position suitable to deposit the metal into the molten metal layer; the organic feedstock may be fed into the furnace via a hollow-core electrode; and the municipal solid waste may be fed into the furnace via the large tubular device 10. The feedstock streams are not limited to such an embodiment, however, and may be mixed and matched based on the available feedstock or the desired output of the furnace. Similarly, the feedstock streams may be mixed and matched in terms of where and how they are deposited in the furnace, based on how such feedstock streams will be processed in the furnace.

The manner in which power is generated from the furnace is not particularly limited. Non-limiting examples of how the power may be generated include that power may be generated using the syngas produced in the furnace or the heat generated from the furnace.

The material fed into the furnace may be pretreated prior to being fed into the reactor so as to have a desired density, shape, size, mass, or the like. Pretreating the material prior to feeding it into the furnace may also lower the risk of non-uniform degradation in the dry atmosphere above the interior slag bath. As examples, the material fed into the furnace may be chopped, shredded, pelletized, powdered or granulated before being fed into the furnace. Municipal solid waste in particular may benefit from being shredded and compacted prior to being fed into the furnace. Metals may be shredded prior to addition to the furnace in certain preferred embodiments.

The physical form of the material to be fed into the furnace may be determined based on how the form will impact the processing of the material. For example, municipal solid waste may be shredded and compacted into sizes and shapes roughly resembling a basketball, or alternatively shapes that are roughly 25-30 inches wide. Such municipal solid waste could be fed into the furnace via the tubular device 10. For municipal solid waste, the size of the material must be large enough that the material will not combust above the slag layer, since municipal solid waste may contain material that would be dangerous if it combusted above the slag layer. Thus, it is not recommended to make the municipal solid waste too small or too light. In addition, the municipal solid waste must not be so heavy or large that it will not break down in the slag layer before sinking to the molten metal layer of the furnace. Thus, in preferred embodiments, the compacted municipal waste is fed into the furnace in the shape of a sphere having a diameter of from 10 inches to 30 inches. In more preferred embodiments, the diameter is 25-30 inches.

On the other hand, some waste material or metals, such as organic materials, may be fed into the furnace at a particle size of less than 2 cubic centimeters. Such a size with respect to organic material will permit organic matter to dissociate prior to entry into the slag layer, which is a beneficial outcome. Such dissociation occurs as a result of the high heat and high organic content of the material. In an embodiment in which pelletized sewage sludge is used, its size may be 2-3 $in^2$ in certain embodiments. In embodiments in which tires are used, the tires may be quartered.

When metal is fed into the furnace, the size and shape of such metal is not particularly limited. The size may range from 1 cm or smaller to 10 meters long or longer. For example, items as small as nuts or bolts may be fed into the furnace, and it is envisioned that if properly pre-processed, items as large as a car may be fed into the furnace.

Material to be fed into the furnace may be pretreated to as to remove excess moisture. The method of drying or removing excess moisture during pretreatment is not particularly limited. Excess moisture in the feedstock could potentially lead to explosions within the furnace. Accordingly, in preferred embodiments, the materials entering the furnace contain from 0% to less than 20% moisture by volume. In more preferred embodiments, the materials entering the furnace contain less than 15%, or less than 10%, or less than 5%, or less than 1% moisture by volume. In a most preferred embodiment, the materials entering the furnace do not contain moisture.

Material to be fed into the furnace may also be pretreated to as to remove excess air. In particular, it is preferred that excess hydrogen, oxygen or other combustible gases be removed from the material. The method of removing air during pretreatment is not particularly limited, and such removal may occur via vacuum or compaction in certain embodiments. Such compaction may be such that the material is compacted into spheres, pellets, or other shapes suitable for processing in the furnace. In preferred embodiments, the material fed into the reactor is free from hydrogen, oxygen or other combustible gases. In particularly preferred embodiments, the material fed into the reactor is free from air pockets.

The inventor has found that municipal solid waste in particular may benefit from pretreatment, including shredding and compaction into spheres. In particular, compacting municipal solid waste permits the furnace to process large volumes of municipal solid waste, higher than those previously known.

The four tubular projections 11 from the circumference of the furnace 1 are connections via which steam is fed to the furnace. Although the figure shows four tubular projections 11, the number of tubular projections is not particularly limited, and may be determined based on, for example, the most efficient way to evenly distribute steam below the surface of the slag layer. The shape of the tubular projections 11 is similarly not particularly limited. In certain embodiments, the steam is fed into the reactor at a controlled uniform rate. In some embodiments, for example, where only organic feedstock and optionally metal is fed into the furnace, it is possible that the addition or use of steam is not necessary.

The tubular projections 11 feed steam into the furnace below the surface of the interior slag bath. In some embodiments, the steam is fed into the furnace just below the surface of the slag bath. Steam is fed into the furnace far enough below the surface of the slag bath to prevent steam from entering the gas portion of the furnace. Because steam contains oxygen, it could potentially provide for an explosion if allowed to come into contact with some of the elements in the gas portion of the furnace resulting from processing.

The steam provides both hydrogen and oxygen into the furnace. In preferred embodiments, the hydrogen and the oxygen are used during the processing of the material in the furnace. For example, the processing of the materials in the furnace may include the degradation of organic material. Degradation of organic materials results in the release of free carbon into the slag bath in the reactor. The free carbon preferably binds to available oxygen, thereby forming carbon monoxide, which is a combustible gas. The free hydrogen is also combustible and both gases will vaporize from the surface of the silica bath in certain embodiments.

Gas may exit from furnace 1 via a gas exit. The gas exit on the crown of the embodiment shown in FIG. 1 is a capped exhaust 12. The type of gas exit is not particularly limited. In this embodiment, the cap is opened via a hydraulic unit, allowing for connection to a transitional pipe that may direct the combustible gases to a cogeneration system. The method of opening or operating the cap is not particularly limited.

In certain embodiments, some of the nitrogen collected from the cogeneration exhaust can be liquefied under pressure and used as the furnace coolant. The remaining nitrogen may be used to support the entry of organic and inorganic materials into the furnace (for example, by providing nitrogen for the pretreatment of the materials to be fed into the furnace) and/or to provide the required anoxic gas atmosphere inside of the furnace. The nitrogen can be separated from carbon dioxide in the cogeneration exhaust via a specialized ceramic membrane filter unit known in the art. The specific filter used is not particularly limited and one such ceramic membrane filter is manufactured by Pall Manufacturing.

The circular units 13 on line A in FIG. 1 are electrodes. The electrodes may be made from those materials known in the art. In certain preferred embodiments, the electrodes are carbon or graphite electrodes. One or both of the electrodes 13 may have portions partially submerged in the slag bath.

The electrodes 13 transport electrical energy and induce the formation of plasma at their tips. The tips of the electrodes may be submerged in the slag bath, or alternatively may be located at a position just above the slag bath.

The electrodes are expendable from the lower end and must be replaced over time. In certain embodiments, the electrodes are made from multiple stacked segments. The stacked segments may be held together by threaded portions, for example by externally threaded male and internally threaded female couplings. Accordingly, replacing the electrodes may include attaching a new section of electrode to a top portion of the electrode (which may be the uppermost portion of the electrode outside of the furnace, where the portion of the electrode closest to the slag bath is considered the bottom of the electrode) and then lowering the electrode into or further into the furnace. Where the electrode segments are threaded together, this may be accomplished by inserting and rotating a new electrode segment into the threaded opening at the top of the electrode, and this may be facilitated by an overhead crane supported by an electrode column stand. This has the advantage of making the operation of the furnace better, since it is not necessary to withdraw the electrodes from the furnace in order to replace them, nor is it necessary to turn off the furnace in order to replace the electrodes. Instead, the new sections of electrode may simply be added to the existing electrodes, which may occur during operation of the furnace. Thus, the furnace may continuously run during the addition of new sections of electrode.

Herein, the term "during operation of the furnace" typically means during a time in which feedstock is being processed in the furnace.

In certain embodiments, the electrodes can have a hollow-core. The diameter of the hollow core is not particularly limited, but typically may have an opening of up to 18 inches in diameter. The diameter of the opening is large enough to permit the efficient feeding of the appropriate materials into the hollow electrode. Such an electrode structure allows for materials to be delivered through the hollow core of the electrode and directly into the plasma or into another part of the furnace. In such embodiments, the material is preferably pelletized, powdered, granulated, or otherwise pretreated as previously disclosed.

Hollow-core electrodes may be used as electrodes that generate a plasma, e.g., nitrogen, arc. In alternative embodiments, hollow-core electrodes may be electrodes that do not generate a plasma arc within the furnace.

The manner and condition in which material may be fed into a hollow-core electrode is similar to how material may be fed into the furnace via tubular device 10. For example, feeding material into a hollow-core electrode may be accomplished in certain embodiments via a nitrogen-charged feeder tube connected to the top one or more, or all of the, electrodes. When material is fed into the furnace via a hollow-core electrode, the tip of the electrode may be present in the gas portion, slag bath, or molten metal layer in the furnace (when the electrode is a non-functional electrode), depending on where it is desired to deposit the material in the furnace. The tube is preferably easily removable so as to facilitate replacing the electrode or adding a new electrode segment. In certain embodiments, organic matter and waste material such as sewage sludge or harbor sediment may be fed into a hollow non-functional electrode which deposits the material in the furnace above the level of the slag. In certain embodiments, municipal solid waste is not fed through a hollow electrode or through a functional electrode. In other embodiments, metal may be deposited into the furnace via a hollow-core electrode.

In embodiments in which the furnace contains more than one electrodes, the electrodes may be either individually the same or different.

The circular unit 14 on line B is a carbon electrode that acts as a backing board to direct the materials entering through the funnel port or feed tube 10 into the slag bath. In this disclosure, such an electrode is sometimes referred to as a backboard electrode. Accordingly, one embodiment of the present disclosure relates to a three-electrode furnace. In certain aspects of that embodiment, either one or two of the electrodes may be non-functional, and thus the plasma arc may be generated by two or one electrodes, respectively, in those certain aspects.

In preferred embodiments, municipal solid waste enters the furnace through the funnel port, hits the backboard electrode, and is thus directed into a predetermined position in the slag bath. The backboard electrode is preferably configured such that it directs materials into the slag bath at a position between functional electrodes, for example electrodes 13. In preferred embodiments, the addition of material into the furnace via the backboard electrode does not disrupt the plasma arc.

In preferred embodiments, metal is fed into the furnace. The metal may be fed into the furnace at any location suitable to deposit the metal into the molten metal layer, and in certain embodiments is deposited into the furnace via a metal feedstock that includes at least 50% metal by mass. In other embodiments, the metal feedstock may include from 50-100% metal, for example at least 60%, at least 70%, at least 80%, at least 90%, or at least 95% metal. In certain embodiments, the metal may be deposited directly into the molten metal layer. In other embodiments, the metal may be fed into the furnace in the slag layer or in the gas layer above the slag layer. When the metal is deposited into the furnace in the slag layer or in the gas layer above the slag layer, the metal will typically fall through the slag layer into molten metal layer. The metal may be deposited into the furnace via an inactive hollow-core electrode, or may be deposited using the backboard electrode. Any pretreatment of the metal or the form in which the metal is fed into the furnace may have an effect on the proper place at which to insert the metal into the furnace.

Both the funnel port and a hollow electrode may be used to feed material into the furnace simultaneously, thereby permitting different feedstock to be fed into the furnace at the same time. For example, municipal solid waste and tires may be fed into the furnace via the funnel port, while pelletized sewage sludge and pelletized harbor sediment is fed into the furnace via a hollow electrode, for example the backboard electrode.

When material that is highly organic, such as sewage sludge, is the only non-metal material added to the furnace, a functional electrode may be used to deliver the material. The increased efficiency from such a system permits for a large size reduction in the furnace, as opposed to a traditional dual electrode system with a separate feeding mechanism or a three-electrode furnace.

Figure 2:
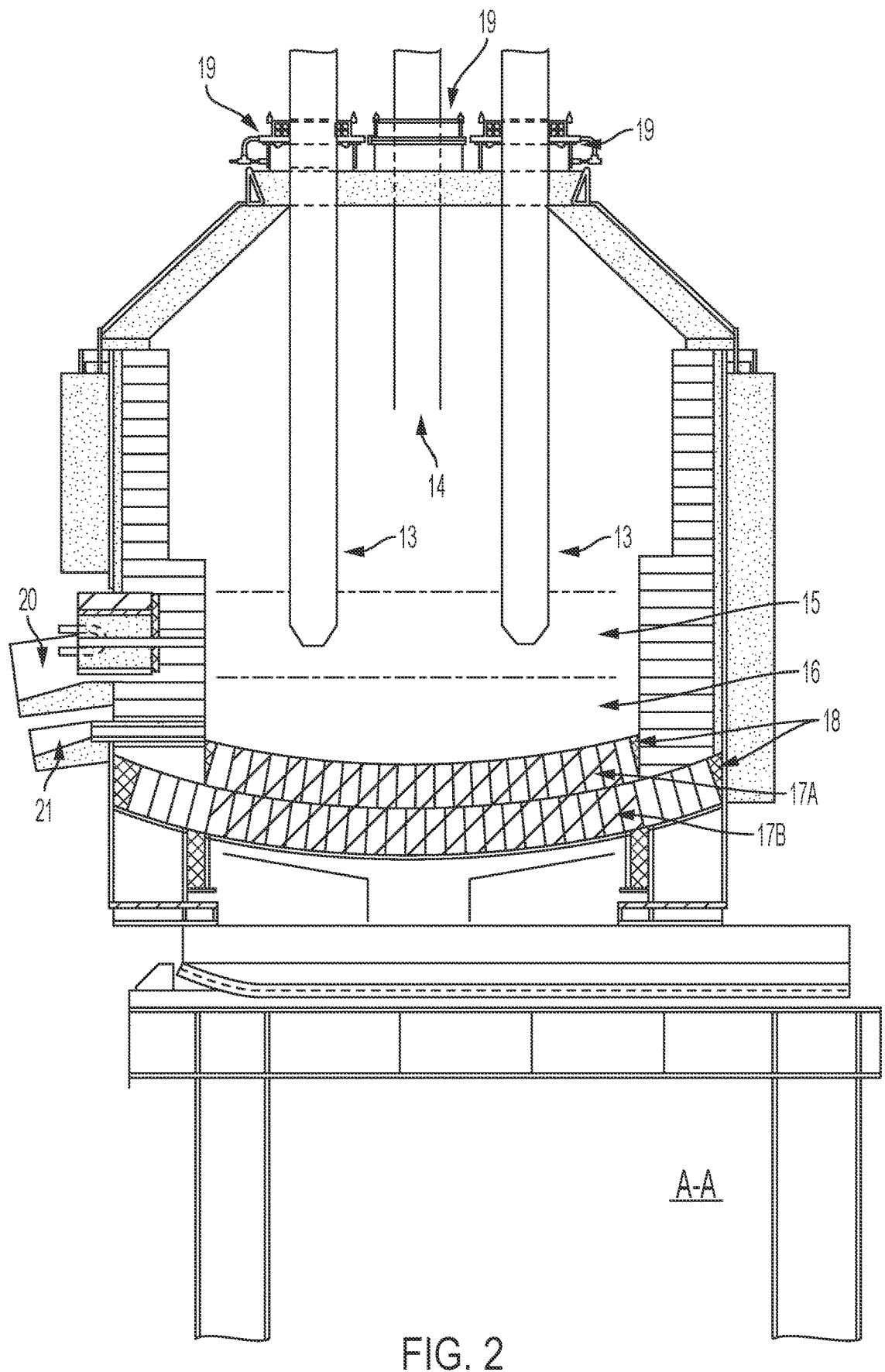
FIG. 2 is a cut-away frontal view of a DC electric arc furnace.

FIG. 2 is a cross-section of the furnace shown in FIG. 1A, taken along line A-A.

The electrodes 13 in FIG. 2 are functional electrodes by virtue of having a plasma arc generated between them. The plasma arc is preferably a nitrogen plasma arc. The electrodes 13 may be located above or in the slag bath, but in preferred embodiments they are located above the slag bath and do not contact the slag bath. Without wishing to be bound by theory, it is believed that the plasma arc between the electrodes enters the slag bath. In FIG. 2, functional electrodes 13 are shown to the left and right of the non-operating electrode 14 (which is non-operating by virtue of not having a part of the plasma arc contact it) that serves as a backboard to direct substances into the slag bath 15.

The slag bath may include molten silica or other materials that have been processed by the furnace. The slag bath may typically be made from non-metallic materials, minerals, or impurities in the feedstock, and forms upon the processing of the feedstock. The temperature of the slag bath may be selected based on the materials to be processed in the furnace. For example, in the case where the material being processed is a complex organic material, it is understood that the most complex organic materials begin to deteriorate at 1,500° C. Thus, a normal operating slag bath temperature for the furnace may be from 1,500-4,000° C., or from 2,500-4,000° C., depending upon the material to be processed, with a temperature of about 4,000° C. or a temperature of 4,000° C. being particularly preferred.

The thickness of the slag bath may vary and may be controlled based on the feedstock fed into the furnace. For example, iron ore may contain a large amount of silicate, which may produce more slag than, for example, steel obtained from scrap. Waste such as municipal solid waste does not typically contain much mineral content, and thus if only municipal solid waste is fed into the furnace, a thick slag layer may not form. The thickness or height of the slag bath may be controlled by draining the slag layer. The drained slag layer may be formed into, for example construction blocks. The drained slag bath may also be deposited into molds of various shapes, depending on the desired end use of the molded and cooled slag.

The thickness of the slag bath may be, for example, 10 feet thick or thicker. For example, the slag bath may be 10-18 feet, and may be in particular 10, 15, or 18 feet thick.

Beneath the slag bath 15 in FIG. 2 is a layer of molten metal 16. The metal is preferably generated from the metal fed into the furnace.

The ratio of the thickness of the slag bath to the thickness of the molten metal layer may vary and may be controlled based on the feedstock fed into the furnace. For example, iron ore may contain a large amount of silicate, which may produce more slag than, for example, steel obtained from scrap, thus leading to a higher ratio of slag to metal. In certain embodiments, the ratio of the thickness of the slag bath to the thickness of the molten metal layer may be predetermined or controlled such that it is maintained at a predetermined ratio.

In certain embodiments, the molten metal layer 16 is at least 18-48 inches thick. In other embodiments, the thickness of the molten metal layer 16 may be at least 24, 30, 36, or 48 inches thick or any subrange therein. The thickness of the molten metal layer 16 may be configured based on the feed rate of metal into the furnace and may be maintained by draining metal out of the molten metal layer at a predetermined rate or height. The height of the molten metal layer may be maintained at a steady state by removing metal from the molten metal layer at the same rate at which metal is added to the molten metal layer.

The molten metal layer is preferably thick enough to permit the metals in the furnace to separate into different strata based on atomic weight, with heavier metals sinking to the bottom of the molten metal layer. In this way, the furnace may be used as a metal separator, by removing metal from the molten metal layer at predetermined positions. For example, if gold or silver separate out at a certain level in the molten metal layer, the furnace may be positioned such that the metal that is drained from the molten metal layer contains the desired gold or silver. A similar process may be used to specifically extract different desired metals from the molten metal layer. Multiple outfeeds may also be used to selectively remove metal from the molten metal layer.

The molten metal layer 16 may contain both ferrous and non-ferrous metal. The metal may be removed from the furnace and formed or processed into an appropriate size and shape depending on the metal's future use.

The functional electrodes 13 shown in FIG. 2 may in some embodiments project into the slag bath 15, but do not contact the molten metal layer 16 beneath the slag bath 15.

The furnace is preferably lined with special ceramic refractory blocks (an example are those produced by RADEX) that can withstand the high temperatures. FIG. 2 shows two layers of blocks 17A and 17B at the bottom of the furnace therein, as well as large blocks 17C that surround both the slag and molten metal layers. Typically, these blocks may deteriorate during routine use, and when that happens, the furnace must be emptied. For example, it may be necessary to replace the blocks every six months.

The molten metal layer 16 may in certain embodiments receive electrical energy via conductors. In the embodiment shown in FIG. 2, the conductors may be, for example, located in an interior layer of blocks that are fed by conductors 18, which in this embodiment are illustrated at the edge of the two rows of blocks 17A and 17B in FIG. 2. The conductors 18 may be connected to feeder cables via conductors on the base of the furnace.

In a single electrode system, the electrical energy received by the molten metal layer 16 establishes an anode and cathode for a functional electrode.

The interior of the furnace may be charged with nitrogen or another plasma-suitable gas and, in the case of nitrogen, the nitrogen atoms may be excited so as to form a plasma. When hollow-core electrodes are used, the hollow cores may also be charged with nitrogen to form a plasma. The temperature of the plasma may be set to a predetermined temperature, based on the desired reaction inside the furnace, and can be adjusted up or down based on the amount of energy applied. For example, the temperature of the plasma can reach 10,000° C. in some embodiments. The temperature of the plasma is transferred to the slag bath, and thus the temperature of the plasma may be used to control the temperature of the slag bath.

The functional electrodes 13 may be held in place on the crown via special collars 19, which in some embodiments may circumferentially surround a portion of the part of the electrode that is located on the exterior of the furnace, and which are configured to have several functions. For example, the electrodes deteriorate at a defined rate at their tips. The collars may include a pressurized fitting that moves the electrode downward at a preset compensatory rate to keep the electrode's relative location in the furnace constant, or to move it up or down to compensate for changes in the slag bath or the molten metal layer. The collars may also include sensors therein or be attached to sensors within the furnace that determine and control the rate and frequency of the electrode lowering and other movements.

The collars 19 also can be adjusted to provide for an appropriate angle of the electrodes. Angling the electrode tips toward each other significantly increases convections within the slag bath and for certain materials may markedly increases the efficiency of the furnace for the processing of, for example, steel, or for the processing of waste materials.

The collars 19 also provide a unique characteristic of the present furnace. In particular, collars 19 are configured to, and provide for the ability to, move the horizontal space between the electrodes a predetermined distance. Such horizontal movement includes expanding or narrowing the distance between the functional electrodes 13, which will alter the rate of convection within the slag bath 15. Widening the gap will diminish convections, and may be suitable for materials processed directly through hollow-core electrodes where the energy demand may be lower. Conversely, narrowing the gap will increase convections, which will result in more uniform temperatures in the slag bath area between the electrodes, where materials fed through the crown vestibule or tubular device 10 will be processed, thus allowing for a more uniform regulation of energy demand. Expanding or narrowing the distance between the functional electrodes 13 allows for further control of the energy used to process materials, and thus allows for a different amount of energy to be used based upon the material being processed and its density and/or composition.

By providing for both horizontal and angular movement of the electrodes (in addition to the previously discussed vertical movement—meaning closer or further from the molten metal layer), the furnace provides for previously unheard of control over the processing conditions within the furnace. Without wishing to be bound by theory, the convection and current flow in the slag layer is controlled by electron flow between the functional electrodes, with closer electrodes providing stronger convection and current flow and further apart electrodes providing weaker convection current flow.

The electrodes may be moved in three dimensions (e.g., angularly, horizontally, and/or vertically) while the furnace is operating so as to maximize the efficiency of the furnace. For example, in one embodiment of the present disclosure, a sample of the feedstock is removed and tested prior to entry into the furnace. The tests may include a test of the moisture content, gas content, organic content, metal content, radioactivity, or other relevant factors. The testing may be performed by, for example, a titrater, a moisture meter, magnetometer, oven, mass spectrometer, gas spectrometer, Geiger counter, an FTIR spectrometer, a Raman spectrometer, a thermogravimetric analyzer, a differential scanning calorimeter, an NMR spectrometer, a scanning electron microscope, an energy dispersive X-ray analyzer, or other suitable apparatus. The vertical, angular, and horizontal positions of the functional electrodes may then be altered based on the results of the sample with no interruption to the operation of the furnace. In this way, different feedstocks may be fed into the furnace and the electrodes may be positioned accordingly without the need to shut down the furnace to move the electrodes. Thus, one embodiment of the present disclosure is the horizontal movement of functional electrodes during the operation of the furnace, where such movement may be determined based on the type of material being fed into the furnace. Another embodiment of the present disclosure includes the vertical movement of functional electrodes during the operation of the furnace, where such movement may be determined based on the volume or feed rate of material being fed into the furnace.

The movement of the electrodes permits for multiple horizontal distances, angles, and/or heights between the electrodes to be utilized without interrupting the feeding of material into the furnace or the operation of the furnace. For example, during the uninterrupted processing (meaning that the furnace is not shut down during processing of the feedstock: the furnace is not shut down for cleaning, adjustment, or maintenance; or alternatively that the feedstock is continually fed into the furnace) of a batch of feedstock of various compositions, the functional electrodes may be moved horizontally and/or angularly once, twice, three times, four times, or more to accommodate different compositions in the feedstock. The furnace is not shut down while the functional electrodes are moving, and the furnace may therefore process materials while the electrodes are moving. This removes the need for time-consuming and expensive furnace downtime between different feedstocks. For example, the electrodes may be moved during processing to accommodate different materials in the feedstock or different ratios of municipal solid waste, organic content or waste, and metal present in the materials fed into the furnace.

FIG. 2 also illustrates two ports 20 and 21. The ports may be used to sample, load, unload, or change the slag or the molten metal. In the embodiment shown in FIG. 2, port 20 is shown with two connections into the furnace: one that may be used to obtain samples or material from the slag bath; and another that may be used to lower the slag bath level without altering the level of the molten metal layer. Thus, port 20 does not contact the molten metal layer. Port 21 is shown with one connection to the furnace, which allows for sampling of the molten metal and also allows for complete emptying of the furnace to facilitate changing the interior ceramic blocks. Thus, port 21 may be present at a part of the furnace which permits all liquid to drain from the furnace using port 21. It is noted that in the embodiment shown in FIG. 2, port 20 is located above port 21 with respect to the bottom of the furnace.

Figure 3:
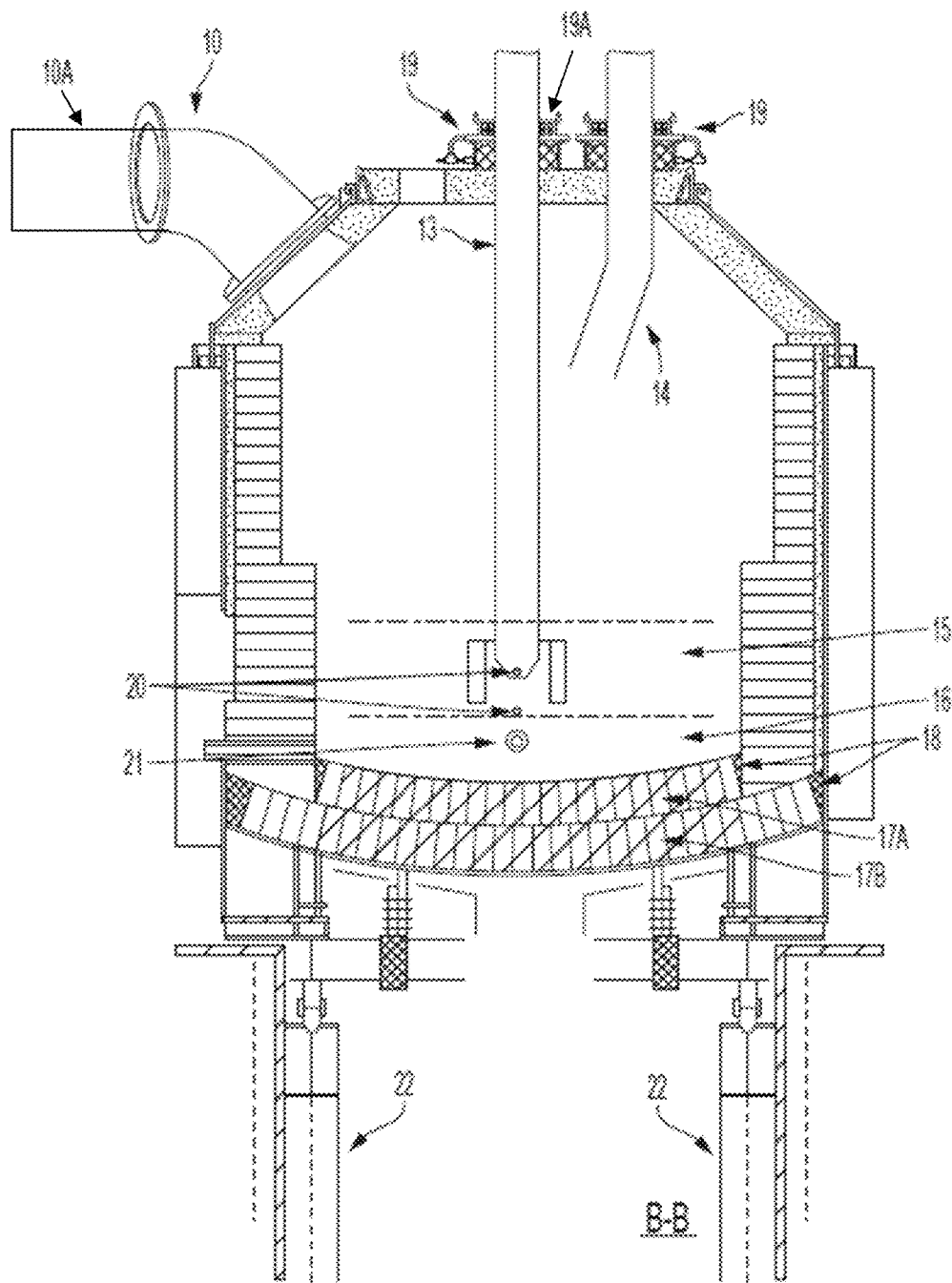
FIG. 3 is a cut-away side view of a DC plasma electric arc furnace.

FIG. 3 is a cross-section of the furnace shown in FIG. 1A, taken along line B-B.

This drawing shows the non-functional, or backboard, electrode 14 with the specialized collar used on the functional electrodes 13.

The backboard electrode 14 does not need to utilize electrical energy and in certain embodiments has a solid core. A portion of the backboard electrode 14 may be canted at an angle and its length is adjusted so that its tip will be above the slag bath and just behind the rear plane of the functional electrodes. The backboard electrode 14 deteriorates at a much slower rate than the functional electrodes, and thus may require replacement of the canted section only once every six months.

In other embodiments, the backboard electrode 14 is a hollow-core electrode, and in those instances may be used to increase the energy ratio of the feedstock, for example by permitting the processing of more highly organic materials as discussed above, for example feedstocks containing more than 65% organic matter. For example, in embodiments in which the backboard electrode is a hollow-core electrode, organic matter having an organic content of greater than 75% may be effectively fed into the furnace, thus increasing the overall organic content of the feedstock fed into the furnace. Such an embodiment may permit the feeding of material into the furnace via the hollow-core electrode of material having an organic content of, for example, from 65-100%. In preferred embodiments, the feedstock fed into the hollow-core backboard electrode may contain 75%, 85%, 95%, or 100% organic content. By feeding highly organic content into the hollow-core electrode, the overall organic content of the non-metal feedstock fed into the furnace may be increased to provide for the disproportionately increased energy output discussed herein.

In certain embodiments, materials to be processed, such as municipal solid waste or tires, may be driven into the furnace under nitrogen pressure, where they will strike the backboard electrode and be guided into the slag bath between the electrodes, which exposes the material to the area of maximum convection and exposes the material to the most uniform temperatures in the slag, thereby leading to degradation.

FIG. 3 also shows the ports 20 as well as the port 21 previously discussed. In the embodiment illustrated in this figure, the ports 20 are located at and below the tip of the functional electrodes 13.

The interior refractory blocks 17A-B contain materials that conduct electrical energy as previously discussed. FIG. 3 also shows conductors 18. In this embodiment, the lower row of blocks 17B is non-conducting, but contains on its upper and lower surfaces insulated conductor material that is connected to the conductors 18 and two cable connections 22 on the base of the furnace.

FIG. 3 also shows a sled beneath wheels on the furnace. The wheels and the sled provide an advantage to the present furnace, in that they allow for easy tilting and maneuvering of the furnace. For example, the sled may be used to tilt the furnace in order to lower the amount of time necessary to drain the furnace. In addition, the wheels and the sled allow the furnace to be moved from location to location with ease. As an example, the wheels may be used in conjunction with a track to move the furnace to or from a trailer truck, a land-based building, or a ship. Thus, the present disclosure relates, in some embodiments, to a portable furnace not previously present in the art.

Figure 4:
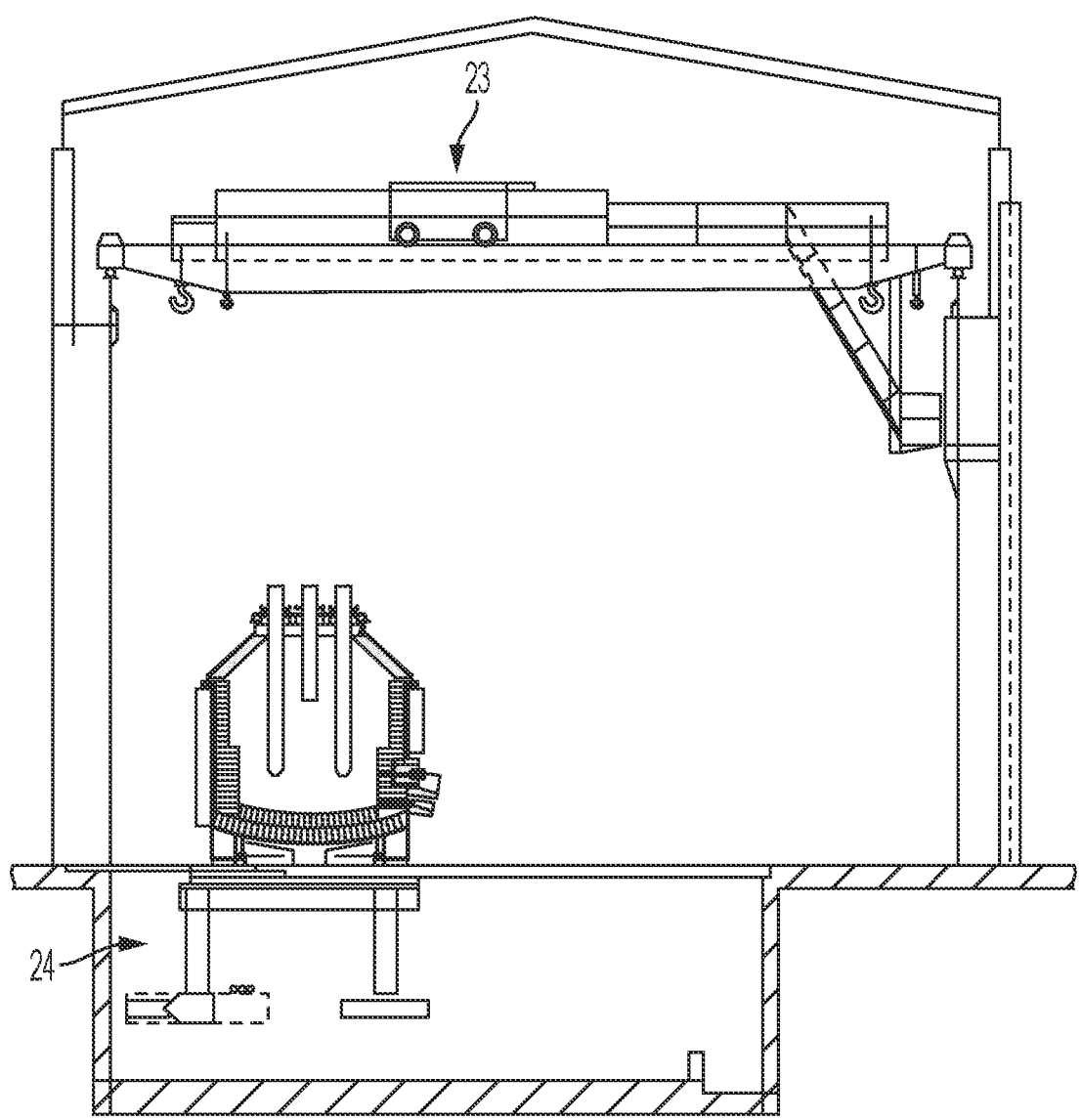
FIG. 4 is a cross-sectional view of the front of a DC plasma electric arc furnace mounted on a stand in an operational format.

FIG. 4 is a cross-section view of the front of the furnace mounted on a stand in an operational format, according to one embodiment.

In the embodiment shown in FIG. 4, a mobile overhead crane 23 is used to lower new electrode segments into position to remove the furnace crown to facilitate changing of the refractory ceramic blocks.

The embodiment shown in FIG. 4 provides a beneficial arrangement and illustrates the presence and use of a caster unit 24 that is configured to and that facilitates pour-off and collection of the molten metal. When the furnace is used for steel production, this provides a method of casting steel slabs and ingots.

Operation of the furnace may be, for example, in a three-story building, with the second and third stories being clearstory. This could eliminate the need for a caster well and facilitate movement of the casters. Alternatively, the furnace may be used in a two-story building.

However, the furnace described herein may be made so as to achieve previously unknown space savings. The furnace arrangement discussed herein, in addition to the high organic content of the processed material, means that the furnace may be constructed in a two-story configuration, i.e., two stories tall, whereas previous furnaces were required to be three stories tall or higher.

Figure 5:
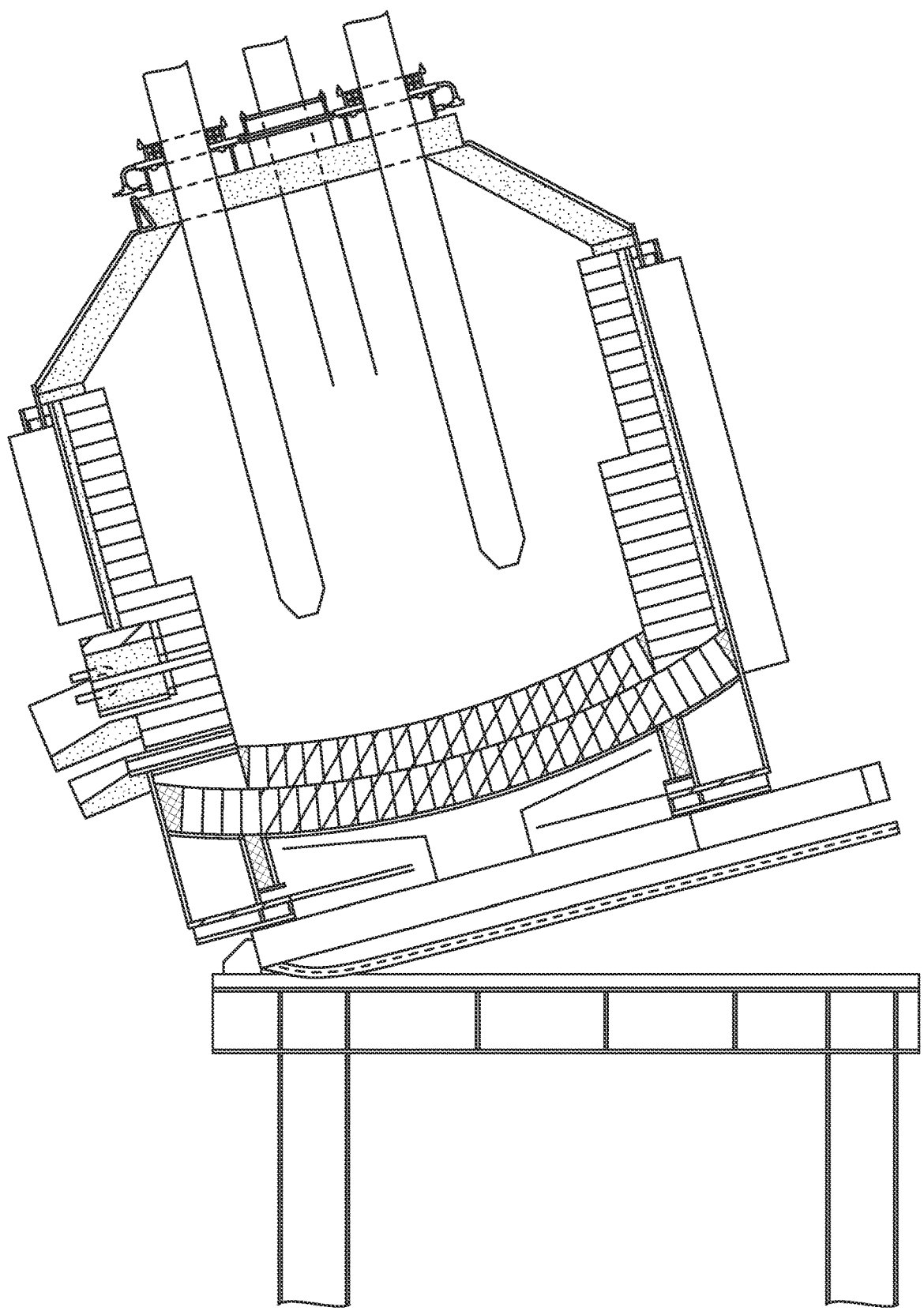
FIG. 5 is a cut-away side view of the furnace in FIG. 4 in an operating position within the framework of a mobile overhead crane.

FIG. 5 is a cut-away side view of the furnace, expanded from FIG. 4, in an operating position within the framework of a mobile overhead crane.

In the embodiment of FIG. 5, the furnace has been mounted on a sled with a canted end, allowing the furnace to be lifted and tilted toward the emptying ports to facilitate complete removal of the slag and/or molten metal to service the furnace, which may include replacing the refractory ceramic blocks. A crane used for such an operation will need to have sufficient lifting capacity, and may require a crane with, for example, at least 27 tons of lifting capacity.

In certain embodiments, the furnace may be manipulated and moved in all three dimensions, thereby permitting controlled placement of the electrodes in relation to the slag layer and the molten metal layer, as well as controlled placement of the loading and unloading ports in the furnace. For example, the furnace may be tilted to a predetermined angle to provide for the drainage of the furnace to allow for maintenance. In certain embodiments, nitrogen may be used to cool the furnace prior to maintenance or after a processing run. As another example of moving the furnace, the furnace may be tilted to a predetermined angle to permit the selective removal of slag, metal, or a particular metal in the molten metal layer.

Figure 6:
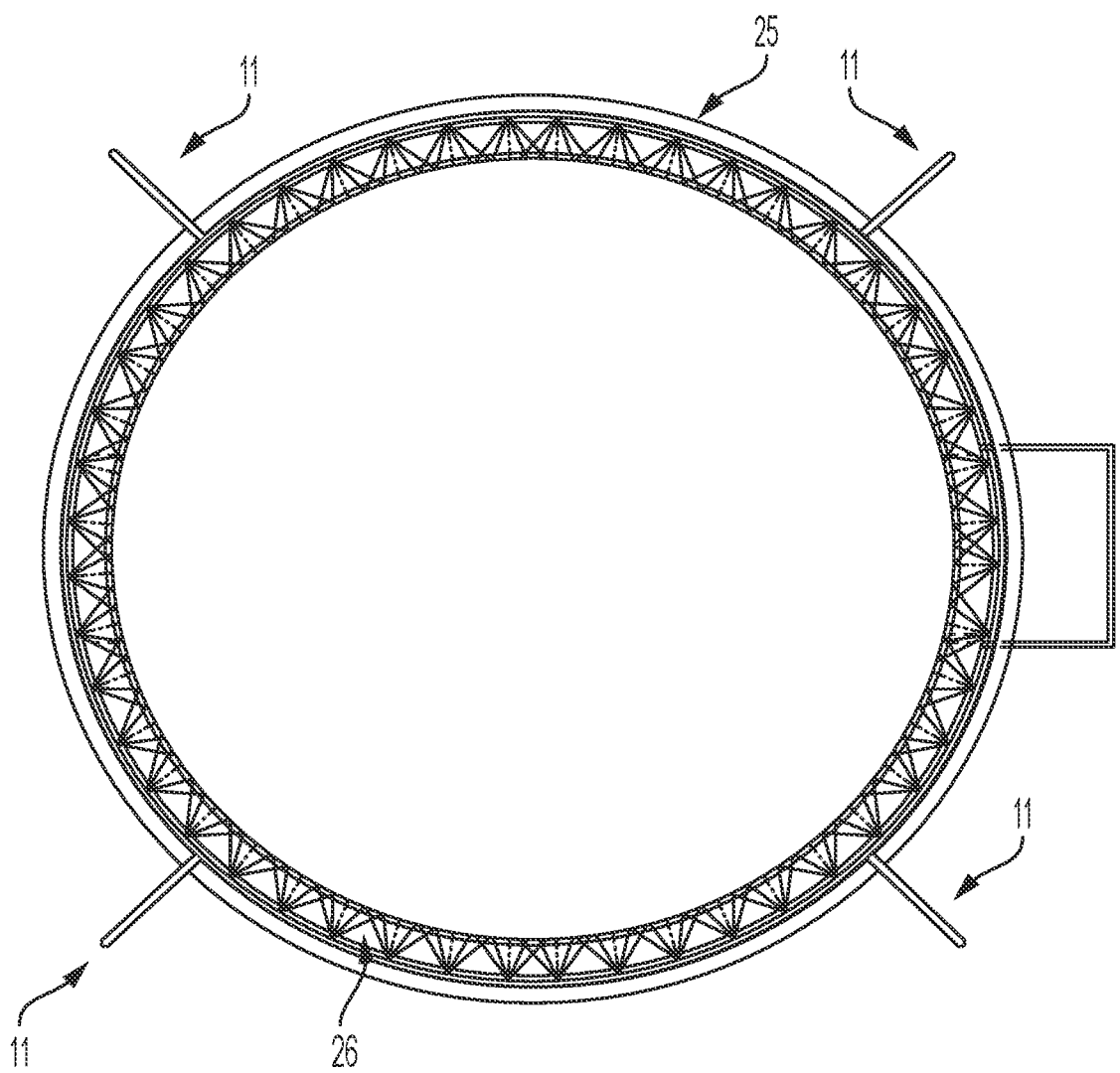
FIG. 6 is a cross-section of one type of system used to inject steam just below the surface of the molten slag bath.

FIG. 6 is a cross-section of an example system used to inject steam just below the surface of the slag bath.

In the embodiment shown in FIG. 6, the four tubular projections 11 are the main steam feeders, and pass through an outer surface of the furnace, which may include steel plates 25. The tubular projections 11 are then shown entering an inner hollow co-plate section 26 of the furnace.

The steam fills this hollow section and enters the slag bath through channels in each refractory ceramic block at a point below the upper surface of the slag bath. This provides for uniform feeding of the steam and breakdown of the water molecules. Convections in the slag bath distribute the free oxygen for maximum coupling with individual carbon atoms, thereby forming carbon monoxide.

Figure 7:
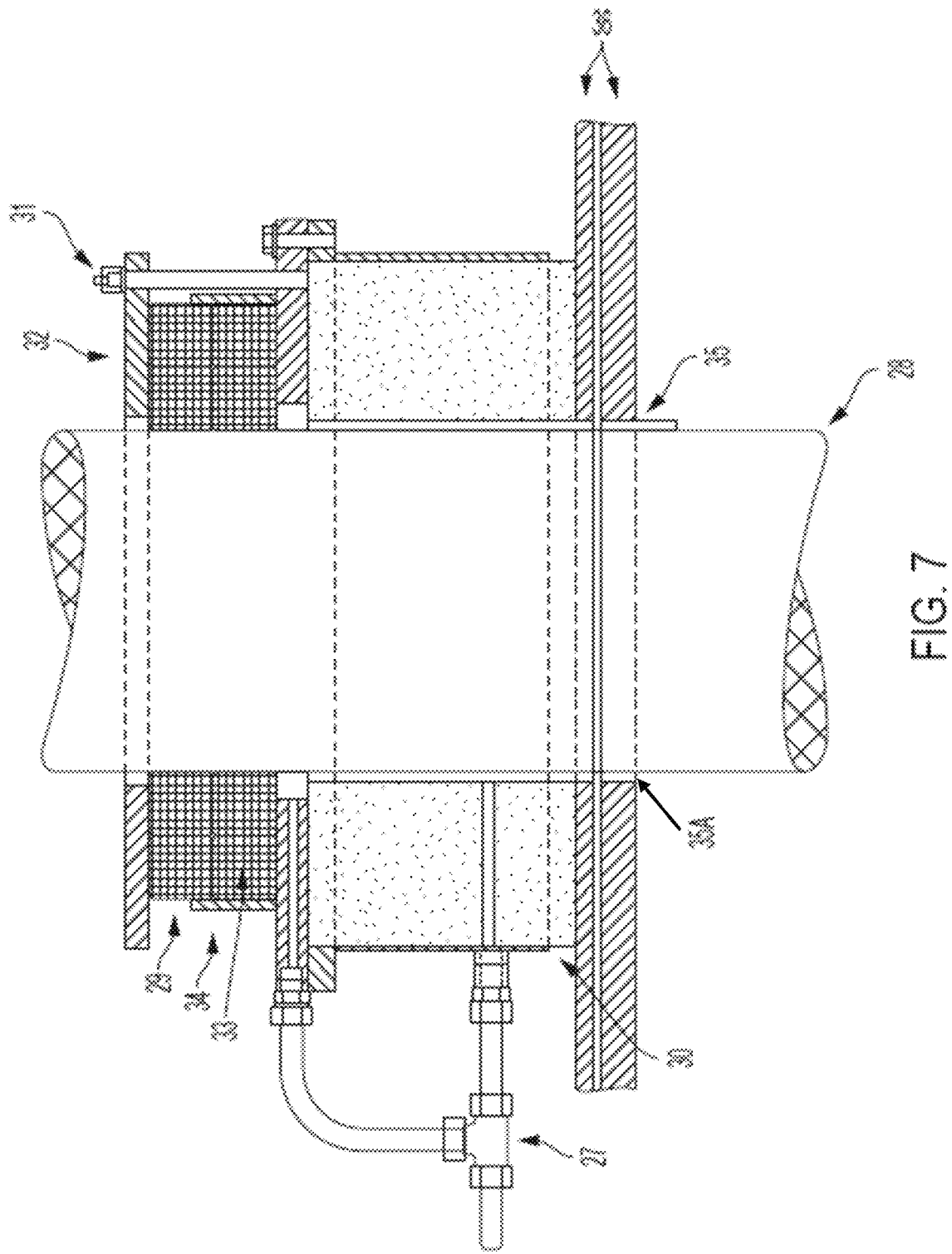
FIG. 7 illustrates some of the mechanisms used to control the utilization, operating angle and spacing of the functional electrodes.

FIG. 7 illustrates example mechanisms used to control the utilization, operating angle and spacing of the functional electrodes.

The system illustrated in FIG. 7 controls utilization and operating angle via air pressure. Although such control could also be accomplished with mechanical devices, it is believed that the air pressure system is more reliable and is less affected by the heat generated by the furnace. Electrode spacing is determined mechanically and may be determined based on the needs of the feedstock. The electrodes may be moved in vertical, horizontal, or angled directions to, for example, customize the shape and location of the plasma arc in the furnace or to control the temperature and current in the slag bath.

FIG. 7 shows a T-fitting 27 containing an actuator valve, located in FIG. 7 to the left of the electrode 28, which allows for differential air pressures between the upper and lower control mechanisms 29 and 30. Air enters the furnace through the T-fitting 27. Here, it is noted that the electrode could be either a functional electrode or a non-functional electrode, such as a backboard electrode. An air pressure outlet 31 feeds through the upper mounting plate 32 on the right side of the electrode 28 and affects the lower control unit on that side.

The crosshatched devices 33 in the upper control unit are in contact with the electrode and are differentially compressible. In certain embodiments, transformers and rectifiers may be present in crosshatched devices 33. Compression in this embodiment is accomplished by applying pressure to move a steel plate 34 against the outer surface of the unit. The interior side of the lower control unit 30 is composed of a similarly compressible material that is in contact with a collar 35 surrounding the electrode. The collar 35 may be made from, for example, polished steel or titanium. Air pressure is developed inside a chamber, putting pressure on the surface of the electrode collar 35. If desired, the air pressure may be applied such that the electrode moves downward by gravity feed as it is consumed at its operating tip. Sensors 35A, which may be located in the collar 35, may monitor this movement and, via the use of appropriate software, notify the operator when a new electrode segment is required. The rate of deterioration is affected by factors such as the operating temperature, whether they are submerged in the slag, and the amount of water in the material being processed. In certain embodiments, a new section of electrode may be inserted once a week.

At the base of the upper and lower control units 29 and 30 in this embodiment are a pair of slide plates 36 mounted in guides above and below the sides of a channel in the steel shell of the furnace crown. In the embodiment shown, the slide plates 36 have a circular opening equal to the diameter of the electrode plus its collar, forming an airtight seal between the electrode 28 and the upper and lower slide plates. In other embodiments, the slide plates 36 have a shape so as to provide for an airtight seal between the electrode 28 and the upper and lower slide plates. In embodiments in which there are two functional electrodes, the distance between the electrodes may be adjusted by moving the slide plates 36 to a desired position, for example to the left or right, and locking them in place.

The operating angle of the electrodes in the furnace may be controlled via a sensor, which may be located in the actuator valve in the T-fitting 27. The sensor triggers air flow through the T-fitting that will result in increased or decreased pressure on one side of the electrode. For example, decreased pressure on the left unit with increased pressure on the right unit cants the electrode inward toward the second electrode and the amount of differential pressure determines the angle. The compressible material on the electrode collar compensates for the differential pressure within the openings in the slide plates.

The furnace as described herein is capable of processing, and may be configured to process, the types of waste typically processed using DC plasma arc furnaces, including, for example, organic waste, inorganic waste, and municipal solid waste. Such waste may include, for example, used tires or scrap steel as described herein. However, the furnace as described herein is also configured so as to process large amounts of metal.

Inorganic and organic wastes may be processed at rates determined by the user, including rates of 15 tons, 25, and up to 75 tons per hour or more. For example, metal may be fed into the furnace at a rate of up to, for example, 25 tons per hour. Municipal solid waste may also be processed at a rate determined by the user, including a rate of, for example, from 10 tons to up to 20 tons per hour. In another example, metal feedstock may be fed into the furnace at a rate of, for example, from 5-25 tons per hour, and in particular 5 tons, 10 tons, 15, tons, 20 tons, or 25 tons per hour. In another example, non-metal feedstock may be fed into the furnace at rates from, for example 15-75 tons per hour, and in particular, 15 tons, 25 tons, 35 tons, 45 tons, 55 tons, 65 tons, or 75 tons per hour. Higher rates may be used if the furnace is configured appropriately. The feed rates of the metal and non-metal feedstocks may be tailored to take advantage of the energy benefits obtained by using the non-metal feedstock as disclosed herein. Feed rates of municipal solid waste may be limited by the asymmetric nature of the municipal solid waste.

The output of the furnace herein may include electrical energy, compressed carbon dioxide, combustible gases having a clean and efficient ratio of hydrogen and carbon monoxide, construction aggregate, and pure steel, which may be formed into slabs or ingots. The output of the furnace may also include metal of various types as processed within the furnace, and in certain embodiments, the output may include metal ingots or castors containing from, for example, 75%-100% of a single type of metal (for example, gold or silver). In certain embodiments, the metal ingots or castors may contain at least 80%, or at least 90%, or at least 95%, or at least 99%, or in some embodiments 100% of a single type of metal, such as gold, silver, or platinum.

Another material that may be output from the furnace and methods described herein is silica sand or vitrified frit. Such material has high value in construction because it is resistant to freeze/thaw cycles. Thus, the use of these materials in roads and other structures that are exposed to heating and cooling cycles serves to extend the life of the roads or other structures.

Because of the compact nature of the furnace described herein, it is possible to load such furnaces onto ships or barges to provide for mobile metal processing centers, mobile power plants, or mobile waste removal systems. The compact size of the furnace means that in some embodiments, up to 20 or about 20 furnaces may be loaded onto a medium sized container ship, or up to 10 or about 10 furnaces may be loaded onto a barge. The barge or container ship may be docked, with conveyor belts running from the dock to each furnace. The conveyor belts may carry the materials from the dock into each furnace. Conveyor belts or power lines may be used to transport the end products from the furnaces back to the dock or other desired destination.

When a ship loaded with furnaces completes processing at one destination, it may travel to a new destination and begin processing materials from the new destination. This is particularly advantageous for those localities that wish to save space by not having dedicated waste removal facilities.

The compact nature of the furnace also means that one or more furnaces may be conveyed from point to point via trucks. For example, a single furnace may be broken into components of sufficient size that three trucks may be sufficient to transport a furnace from point to point.

In addition, the present disclosure envisions an emergency power generating station or metal processing center or waste removal system for areas hit by disasters, where those disasters may have hampered that area's ability to generate power, process metal, or remove or process waste. A barge system such as described herein may be particularly beneficial in areas that have been impacted by natural disasters such as hurricanes, as the barge may enter the area when safe and then aid in the removal of debris and waste while generating electricity from the debris and waste.

Example: Processing of Harbor Sediment

Harbor sediment was processed in a DC plasma arc furnace with the results shown in Table 1:

TABLE 1

| Item | Untreated content mg/g | Amount dissociated during processing | | Percent dissociated during processing % |
|---|---|---|---|---|
| | | mg/sample | mg/g | |
| Acenaphtene | 0.15 | 0.406 | 0.012 | 92 |
| Acenaphtylene | 0.51 | 0.581 | 0.017 | 97 |
| Anthracene | 0.8 | 1.94 | 0.057 | 93 |
| Benzo[a]anthracene | 1.46 | 0.647 | 0.019 | 99 |
| Benzo[a]pyrene | 1.63 | 0.42 | 0.012 | 99 |
| Benzo[b]fluoranthene | 2.31 | 3.57 | 0.104 | 95 |
| Benzo[g,h,i]perylene | 1.03 | 2.71 | 0.079 | 92 |
| Benzo[k]fluoranthene | 0.72 | 0.42 | 0.012 | 98 |
| Chrysene | 1.63 | 1.3 | 0.038 | 98 |
| Dibenzo[a,h]anthracene | 0.3 | 0.07 | 0.002 | 99 |
| Fluoranthene | 2.95 | 10.1 | 0.295 | 90 |
| Fluorene | 0.22 | 0.54 | 0.016 | 93 |
| Indeno[1,2,3-cd]pyrene | 1.12 | 0.481 | 0.014 | 99 |

TABLE 1-continued

| Item | Untreated content mg/g | Amount dissociated during processing mg/sample | | Percent dissociated during processing % |
|---|---|---|---|---|
| | | | mg/g | |
| Naphthalene | 0.31 | 37.1 | 1.082 | −249 |
| Phenantrene | 1.29 | 30.3 | 0.884 | 31 |
| Pyrene | 2.69 | 4.28 | 0.125 | 95 |

In Table 1, the untreated content reflects the amount of each listed material present in the harbor sediment that was tested. Bricks of the slag layer were tested to determine the amount of each material dissociated in the furnace. Without wishing to be bound by theory, it is hypothesized that the increased naphthalene content is a result of other listed compounds breaking down to form naphthalene. The un-dissociated materials were encapsulated and fixated in the slag. The un-dissociated materials were non-leachable.

For the data in Table 1, sewage sludge was added to the furnace together with the harbor sediment.

Hence, Table 1 illustrates that certain embodiments of the present disclosure may be used to process harbor sediment.

Even though certain specific embodiments are thoroughly described in the present application, it should be understood that the same concepts disclosed with respect to those specific embodiments are also applicable to other embodiments. Furthermore, individual elements of the furnace and methods disclosed herein are described with reference to particular embodiments only for the sake of convenience. It should be understood that individual elements of the furnace and methods disclosed herein are applicable to embodiments other than the specific embodiments in which they are described.

In addition, it should be understood that the scope of the present disclosure is not limited to the above-described embodiments, and those skilled in the art will appreciate that various modifications and alterations are possible without departing from the scope of the present disclosure.

The invention claimed is:

1. A furnace configured to process metal and waste materials, wherein the furnace is a DC plasma arc furnace, and wherein the furnace is configured to process a metal feedstock at the same time as a non-metal feedstock,
    wherein the furnace comprises refractory blocks sufficient to withstand temperatures of at least 2,500° C.
    further comprising at least one electrode comprising a collar configured to permit horizontal movement and/or angular movement of an electrode during processing of feedstock, and
    further comprising sensors monitoring the movement and/or position of the collar.

2. The furnace according to claim 1, further comprising a vestibule configured to remove oxygen and/or reactive gases from feedstock.

3. The furnace according to claim 2, wherein the vestibule provides pressure to push feedstock into the furnace.

4. The furnace according to claim 1, comprising a conveyor belt configured to provide feedstock to the furnace.

5. The furnace according to claim 1, wherein the non-metal feedstock comprises one or more items selected from the group consisting of waste materials, municipal solid waste, iron ore, radioactive material, organic material, industrial or household waste chemicals, chemical weapons, medical waste, radioactive material, infectious or otherwise biologically hazardous materials, human or animal sewage, soils or marine sediments excavated or dredged from contaminated sites, recovered waste material excavated from landfills, used tires, used oil filters, vegetable or petroleum based oils, oil bearing shale, and high sulfur coal.

6. The furnace according to claim 1, wherein the non-metal feedstock contains from 0% to less than 50% metal.

7. The furnace according to claim 1, wherein the non-metal feedstock is 65-100% organic and the metal feedstock is at least 50% metal.

8. The furnace according to claim 1, comprising an entry point configured for non-metal feedstock and a different entry point configured for metal feedstock.

9. The furnace according to claim 1, comprising tubes configured to be present at a level beneath a top of a slag layer in the furnace, wherein the tubes are configured to deliver steam to the furnace.

10. The furnace according to claim 1, comprising a gas exit.

11. The furnace according to claim 1, comprising at least two electrodes.

12. The furnace according to claim 11, comprising at least three electrodes.

13. The furnace according to claim 11, wherein a plasma arc is generated between at least two of the electrodes.

14. The furnace according to claim 1, wherein the furnace is configured such that when a slag bath is present in the furnace, tips of at least one electrode are submerged in a slag bath inside the furnace.

15. The furnace according to claim 1, wherein one or more of the electrodes comprise multiple stacked segments.

16. The furnace according to claim 1, comprising a backboard electrode.

17. The furnace according to claim 16, wherein the backboard electrode does not generate a plasma arc.

18. The furnace according to claim 1, wherein one or more of the electrodes are hollow-core electrodes.

19. The furnace according to claim 1, configured to accommodate a slag bath layer that is 10-18 feet thick and a molten metal layer that is 18-48 inches thick.

20. The furnace according to claim 1, comprising one or more items selected from the group consisting of a titrater, a moisture meter, magnetometer, oven, mass spectrometer, gas spectrometer, Geiger counter, an FTIR spectrometer, a Raman spectrometer, a thermogravimetric analyzer, a differential scanning calorimeter, an NMR spectrometer, a scanning electron microscope, and an energy dispersive X-ray analyzer.

21. The furnace according to claim 1, comprising a port located at a level of a slag bath and/or a port located at a level of a molten metal layer.

22. The furnace according to claim 1, comprising wheels configured to transport the furnace.

23. The furnace according to claim 1, wherein the furnace is portable.

24. The furnace according to claim 1, wherein the furnace is two stories tall.

25. The furnace according to claim 1, configured to process from 15-75 tons of inorganic and organic waste.

26. The furnace according to claim 1, configured to process from 10-25 tons of metal per hour.

27. The furnace according to claim 1, configured to produce frit.

28. A ship comprising the furnace according to claim 1.

* * * * *